(12) United States Patent
Shilo et al.

(10) Patent No.: US 12,330,082 B2
(45) Date of Patent: Jun. 17, 2025

(54) TELESCOPIC ITEM AND MECHANSIM THEREFOR

(71) Applicants: Yair Shilo, Kibbutz Shefayim (IL); Amitai David Fried, Givat Shmuel (IL)

(72) Inventors: Yair Shilo, Kibbutz Shefayim (IL); Amitai David Fried, Givat Shmuel (IL)

( * ) Notice: Subject to any disclaimer, the term of this patent is extended or adjusted under 35 U.S.C. 154(b) by 0 days.

(21) Appl. No.: 18/631,090

(22) Filed: Apr. 10, 2024

(65) Prior Publication Data
US 2024/0261695 A1    Aug. 8, 2024

Related U.S. Application Data

(63) Continuation of application No. 17/539,525, filed on Dec. 1, 2021, now Pat. No. 11,980,827.

(51) Int. Cl.
A63H 33/00    (2006.01)
A63H 33/22    (2006.01)

(52) U.S. Cl.
CPC .......... *A63H 33/009* (2013.01); *A63H 33/22* (2013.01)

(58) Field of Classification Search
CPC ...... A63H 33/009; A63H 33/22; A63H 29/22; Y10T 74/18672; F16B 7/105
USPC ................ 446/473, 485, 487; 463/47.2, 47.7
See application file for complete search history.

(56) References Cited

U.S. PATENT DOCUMENTS

| | | | | |
|---|---|---|---|---|
| 2,759,294 A * | 8/1956 | Tigrett | ..................... | A63H 5/04 124/16 |
| 3,037,320 A * | 6/1962 | Powell | ................. | A63H 33/009 446/487 |
| 3,799,485 A * | 3/1974 | Wolters | ..................... | A47C 3/24 248/406.1 |
| 4,062,156 A * | 12/1977 | Roth | ....................... | F16B 7/105 343/903 |
| 4,231,077 A * | 10/1980 | Joyce | ..................... | F21L 4/005 362/558 |
| 4,678,450 A * | 7/1987 | Scolari | ................. | A63H 33/009 362/202 |
| 4,697,228 A * | 9/1987 | Mui | ......................... | F21L 4/02 362/208 |
| 4,717,365 A * | 1/1988 | Andersen | ............... | A63H 33/00 446/230 |
| 4,793,197 A * | 12/1988 | Petrovsky | ............... | F16H 25/20 248/161 |
| 4,869,704 A * | 9/1989 | Fisher | .................... | A63H 33/00 267/199 |

(Continued)

FOREIGN PATENT DOCUMENTS

CN        207856322        9/2018

*Primary Examiner* — Alexander R Niconovich
(74) *Attorney, Agent, or Firm* — Dekel Patent Ltd; David Klein

(57) ABSTRACT

A method of providing a telescopic assembly includes providing a power mechanism to rotate a threaded spindle which is coupled to telescopic segments. Rotating the threaded spindle causes the telescopic segments to extend out of a handle to an extended position. A safety feature is provided such that, if the telescopic segments in the extended position are pressed by a poking force against a person, the poking force causes the telescopic segments to retract in a direction towards the handle thereby preventing injury to the person, and the power mechanism and the threaded spindle are not compromised or destroyed by retraction of the telescopic segments due to the poking force.

7 Claims, 20 Drawing Sheets

(56) References Cited

U.S. PATENT DOCUMENTS

| | | | | |
|---|---|---|---|---|
| 5,145,446 A * | 9/1992 | Kuo | A63H 5/04 | 446/485 |
| 5,149,092 A * | 9/1992 | Parsons | F41B 15/027 | 463/47.7 |
| 5,279,513 A * | 1/1994 | Connelly | A63H 33/009 | 446/485 |
| 5,919,079 A * | 7/1999 | Coleman | A63H 33/009 | 446/487 |
| 5,947,789 A * | 9/1999 | Chan | A63H 33/009 | 446/485 |
| 6,036,576 A * | 3/2000 | Colon, Jr. | A63H 33/009 | 446/485 |
| 6,082,876 A * | 7/2000 | Hanson | F21V 9/45 | 362/186 |
| 6,945,842 B1 * | 9/2005 | Gulmesoff | A63H 33/22 | 446/486 |
| 7,445,550 B2 * | 11/2008 | Barney | A63F 13/31 | 446/175 |
| 7,476,141 B2 * | 1/2009 | Hom | A63H 33/22 | 446/485 |
| 7,533,591 B2 * | 5/2009 | Wang | F16H 25/20 | 5/616 |
| 7,611,398 B2 * | 11/2009 | Woodhouse | A63H 33/009 | 446/485 |
| 7,684,694 B2 * | 3/2010 | Fromm | F16M 11/28 | |
| 8,443,685 B2 * | 5/2013 | Wu | F16H 25/12 | 74/89.36 |
| 9,579,587 B1 * | 2/2017 | Chen | A63H 33/009 | |
| 10,065,127 B1 * | 9/2018 | Honeck | A63H 33/26 | |
| 10,500,518 B2 * | 12/2019 | Graves | A63H 33/009 | |
| 11,129,465 B1 * | 9/2021 | Goslin | F21V 21/145 | |
| 11,484,810 B2 * | 11/2022 | Faivre | A63H 33/22 | |
| 2004/0127292 A1 * | 7/2004 | Chan | A63H 33/009 | 463/47.2 |
| 2005/0160846 A1 * | 7/2005 | Chiang | H02K 7/06 | 74/89.35 |
| 2006/0091277 A1 * | 5/2006 | Wang | A47G 33/06 | 248/405 |
| 2007/0254553 A1 * | 11/2007 | Wan | A63H 33/22 | 446/175 |
| 2007/0270077 A1 | 11/2007 | Woodhouse | | |
| 2008/0051002 A1 * | 2/2008 | Chung Wong | F41B 11/641 | 446/473 |
| 2010/0018334 A1 * | 1/2010 | Lessing | F16H 25/20 | 74/89.35 |
| 2014/0106644 A1 * | 4/2014 | Urbaniak | A63H 33/00 | 446/487 |
| 2015/0314213 A1 * | 11/2015 | Zhou | A63H 33/22 | 446/485 |
| 2019/0232183 A1 * | 8/2019 | Siddeeq | A63H 33/009 | |
| 2022/0203252 A1 * | 6/2022 | Fahmie | A63H 33/009 | |
| 2022/0410026 A1 * | 12/2022 | Sacha | A63H 33/22 | |
| 2024/0108998 A1 * | 4/2024 | Chen | A63H 33/26 | |

* cited by examiner

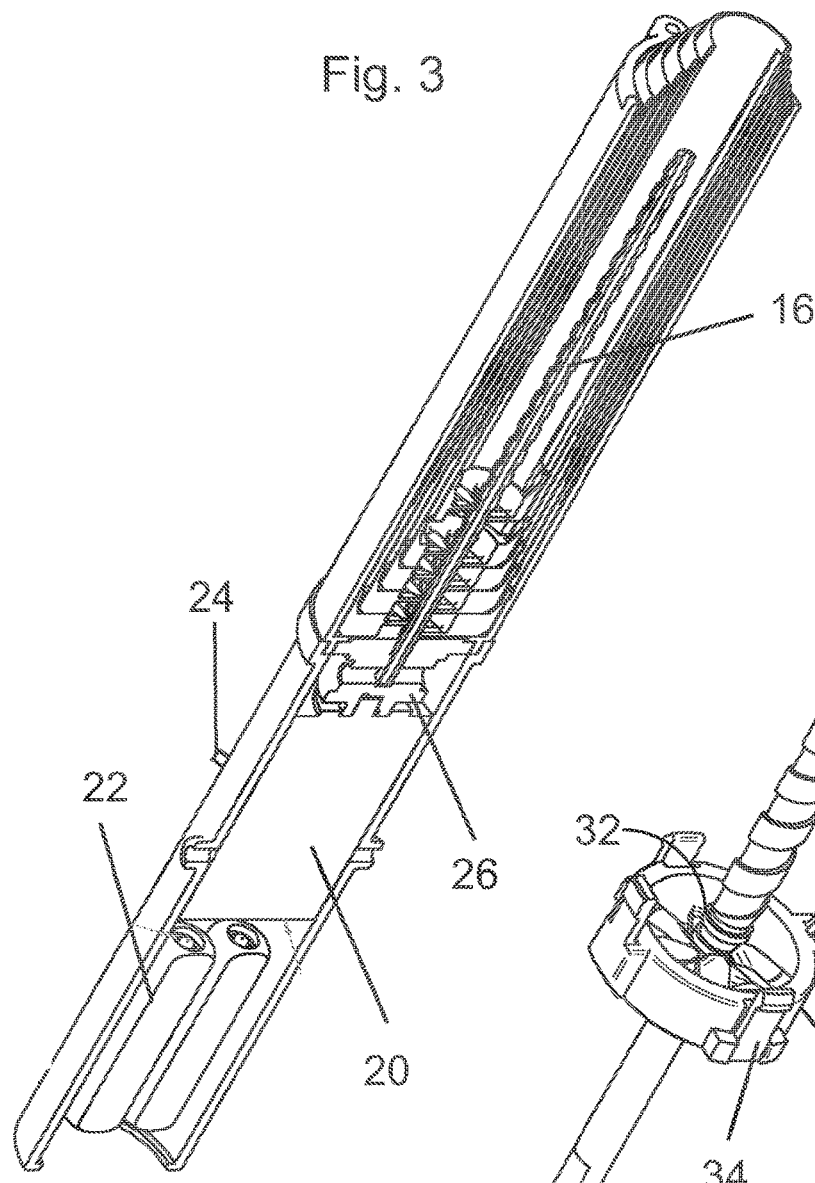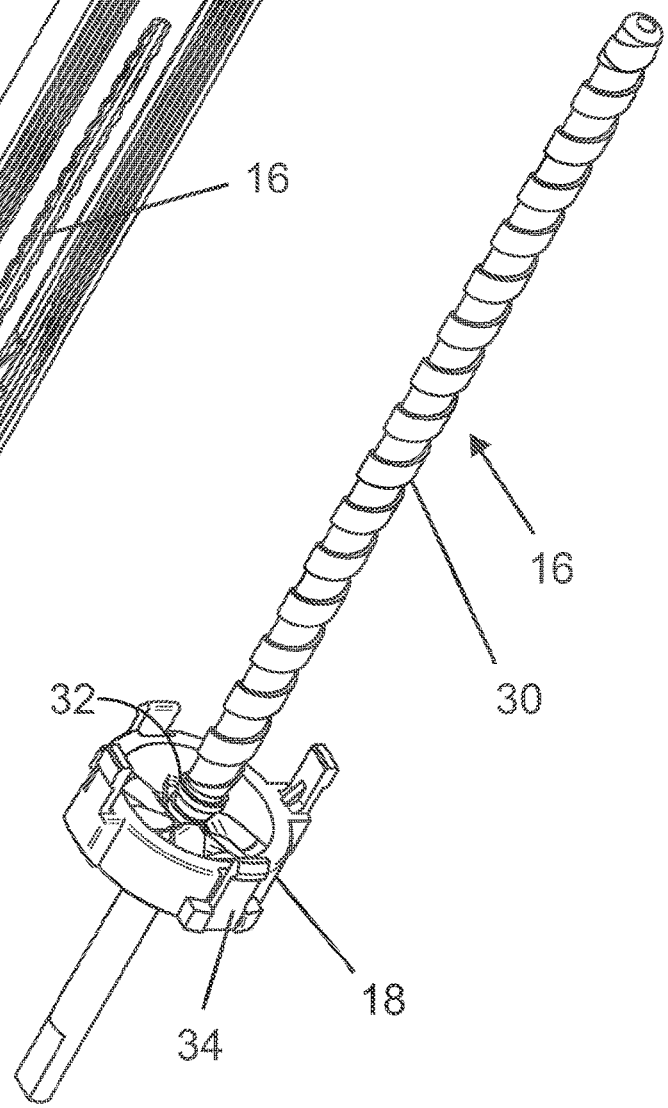

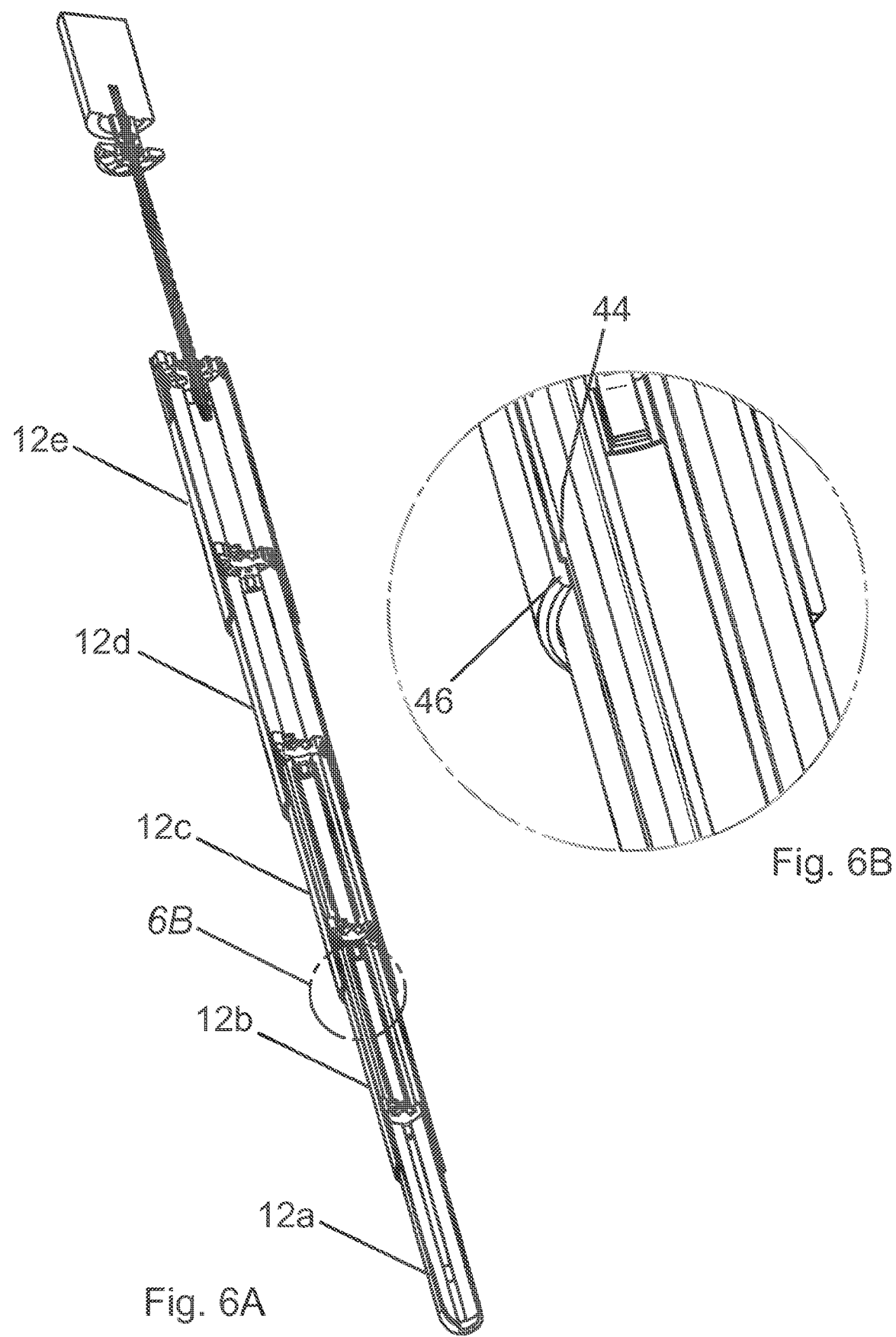

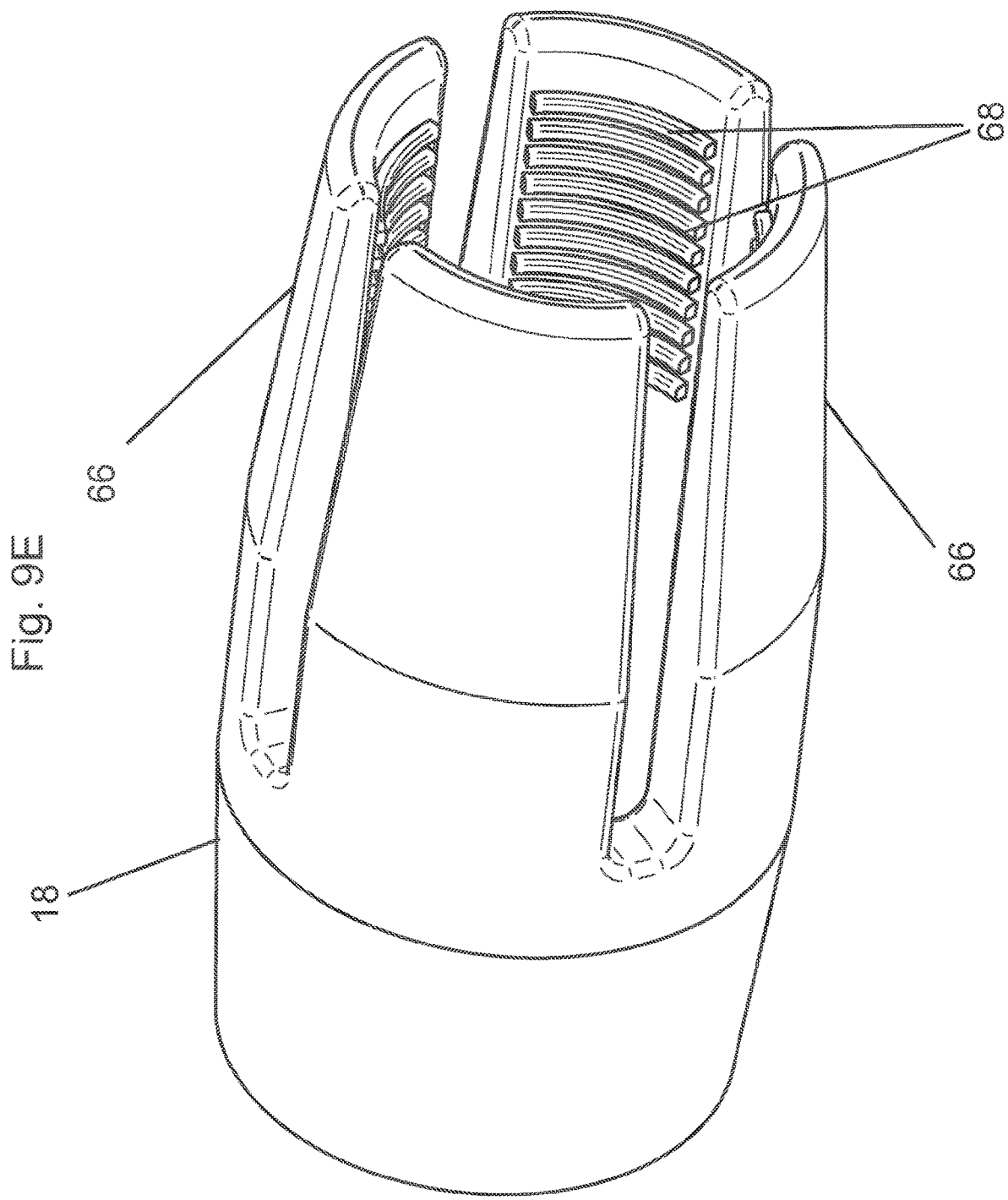

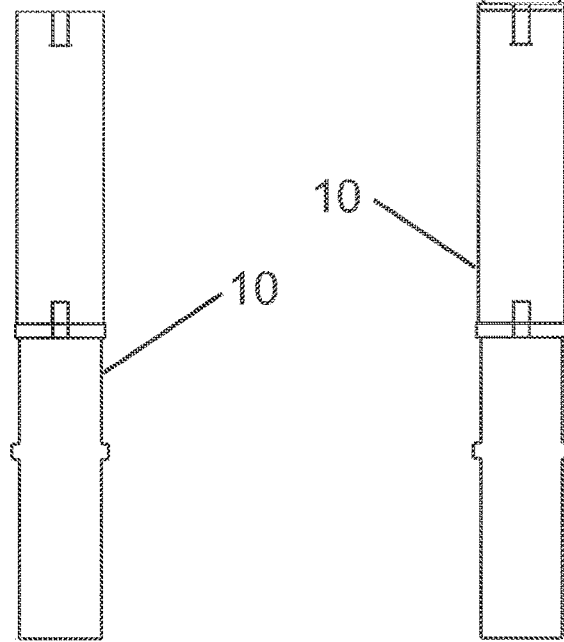
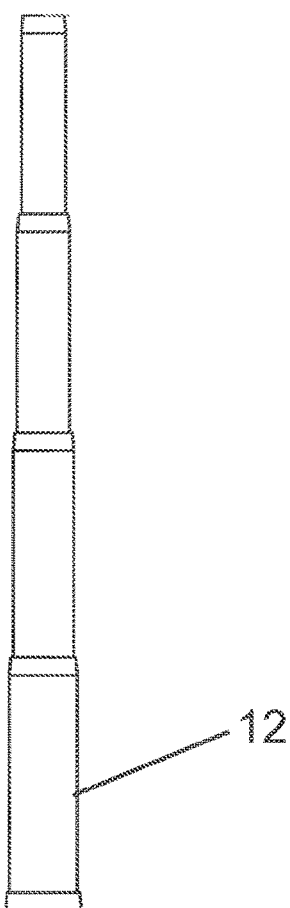
Fig. 10A
Fig. 10B

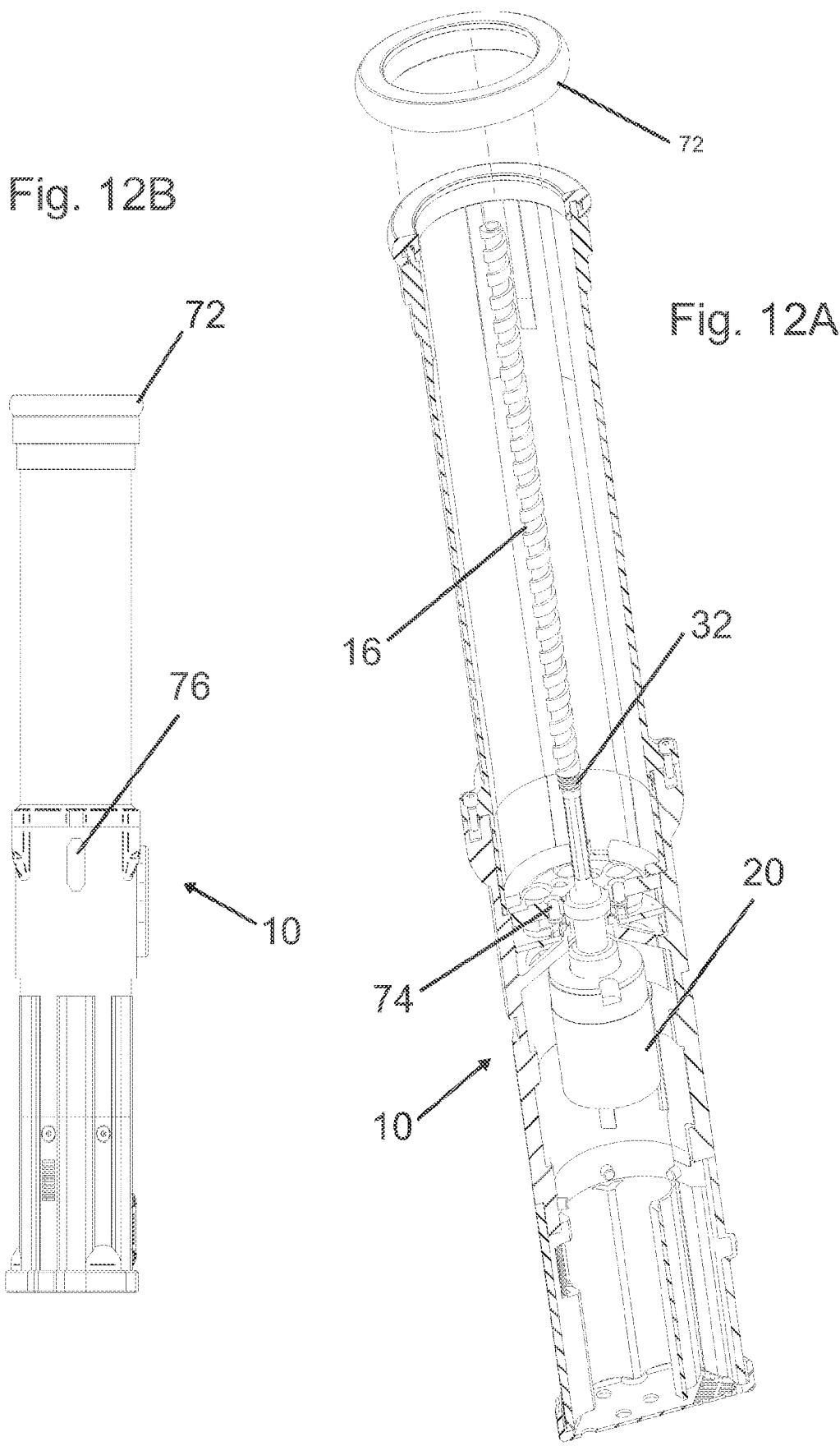

TELESCOPIC ITEM AND MECHANSIM THEREFOR

CROSS-REFERENCE TO OTHER APPLICATIONS

This application claims priority from and is a continuation of U.S. patent application Ser. No. 17/539,525, filed Dec. 11, 2021, which is incorporated herein by reference.

FIELD OF THE INVENTION

The present invention relates to a telescopic mechanism for extending telescopic segments, in particular a telescopic segment extension and retraction mechanism configured to extend and retract segments (i.e. sleeve-like sequential segments).

BACKGROUND OF THE INVENTION

Toy swords are popular toys with a large market. A telescoping feature can add to the enjoyment.

Examples of toy swords or sabers with a telescoping feature are disclosed in U.S. Pat. No. 7,611,398 (Hasbro Inc., 2009 Nov. 3) and U.S. Pat. No. 10,500,518 (Graves, 2019 Dec. 10); and a telescoping mechanism for a camera support is also disclosed in U.S. Pat. No. 7,684,694 (Fromm; 2010 Mar. 23).

SUMMARY OF THE INVENTION

The present invention relates to a telescopic item and mechanism therefor. The telescopic item may be constituted by a toy sword, or constituted by or incorporated in several other products.

According to one aspect of the present invention there is provided a telescopic mechanism for a toy sword or the like. The mechanism includes a plurality of hollow telescopic blade segments having at least a proximal and a distal blade segment. The mechanism also includes a threaded spindle having spindle threads, disposed within the telescopic blade segments; a plurality of nuts configured to correspond to and interface with the spindle; and a power mechanism configured to spin the spindle. Each of the nuts respectively interfaces at the proximal portion of each of the hollow blade segments and the nuts have nut threads corresponding to the spindle threads. The nut threads are suitably sturdy whereby the nuts will move back and forth over the spindle threads when the spindle is rotated, but the nut threads are flexible and resilient enough whereby the nut threads will slide over the spindle threads if the distal telescopic blade segment is pushed above a given or predetermined threshold force into a suitably rigid body or object in order to allow any extended blade segments to retract.

The nut threads may include teeth. The teeth may be disposed at different heights or levels around respective nuts in a spiral staircase-like manner. The nuts may include teeth side supports disposed at the sides of the teeth. The nut threads may be constituted by upwardly extending petal-like projections having ridges for engaging with the spindle thread. The teeth side supports may be Y-shaped.

The nuts may be configured to be attachable to respective proximal ends of the blade segments. The nuts may be attachable to respective proximal ends of the blade segments via one or more segment-connection elements.

One or more segment-connection elements may include shoulders configured to snap into corresponding spaced apart apertures or cut-outs at the proximal ends of the respective blade segments.

The nuts may include one or more nut-to-segment friction members having a resilient arm with an outwardly facing shoulder to provide a finite but minimal friction resistance with the blade segments to prevent the blade segments from spontaneously retracting until desired.

The nut threads may include a flexible and resilient central annular element. The nut threads may include a flexible and resilient strip. The nut threads may include a flexible and resilient spiral member. The nut threads may include a wine-glass shaped resilient spindle-thread interface element. The nut threads may include petal-like projections having ridges.

The blade segments may have an outwardly facing step at their proximal ends and a corresponding inwardly facing shoulder at their distal ends, or vice versa, to prevent the blade segments from detaching from each other during extension.

The spindle may include a nut/segment-brake mechanism or a segment extension restraining mechanism to prevent the blade segments from detaching from each other. The nut/segment-brake mechanism or the segment extension restraining mechanism may be configured to prevent each blade segment from extending until a previously extended blade segment has fully extended. The nut/segment-brake mechanism or the segment extension restraining mechanism may include a brake ring. The nut/segment-brake mechanism or the segment extension restraining mechanism may include one or more friction elements disposed in the proximal interior end of the blade segments. The nut/segment-brake mechanism or the segment extension restraining mechanism may include a restraining lever whose proximal end is attached to a hilt of the sword. The nut/segment-brake mechanism or the segment extension restraining mechanism may include a restraining lever that includes a rotatable wheel at its distal end.

The blade segments may have one of a tapered cylindrical shape; a tapering square profile; a tapering square profile; a tapering rectangular profile; a tapering elliptical profile; and a tapering polygonal profile.

The sword may include a segment holder. The power mechanism may include a motor and a power source. The power mechanism may include a manually powered mechanism.

The mechanism may include a blade segment extension stopper including outwardly facing steps at the proximal ends of the blade segments corresponding to inwardly facing shoulders at the distal ends of the blade segments, or vice versa, whereby the blade segments are stopped after being extended to their predetermined full extent.

The blade segments may include a segment spin-prevention mechanism to prevent the blade segments from spinning. The segment spin-prevention mechanism may include an elongated groove in one side of each segment and a corresponding rail in the other side of an adjacent segment. The segment spin-prevention mechanism may include through-holes in the nuts through which corresponding rods pass through.

The sword may include an illumination device. The illumination device may include light bulbs or LEDs at the top of the hilt of the sword, whereby outer portions of the blade segments are illuminated. The illumination device may include one or more of the flexible nuts, which include one or more illumination elements configured to light up the blade segments, each blade segment having an electrical conductor from a power source. The illumination device may include piercings in the segments to allow light to shine there-through. The illumination device may include one or more illumination windows.

At least one of the nuts may be made of a transparent or translucent material.

Thus, the invention provides a telescopic mechanism for extending telescopic segments, in particular a telescopic segment extension and retraction mechanism configured to extend and retract segments (i.e. sleeve-like sequential segments).

The telescopic mechanism can be implemented in a variety of applications, for example: a toy sword; a retrieval arm; a pointer; a tree-branch saw cutter; a fishing rod; a "selfie" camera-stick; tri-pod legs; an antennae; novelty items (e.g. extending horns on a hat); a parking lot gate or other such gates (opening/extending and retracting); telescopes and binoculars; vacuum cleaner tubes; microphone handles; tools, such as screw drivers; and so forth.

For convenience, the extension/retraction mechanism will be described in connection to a toy sword with a telescopic blade (telescopic blade segments), however it should be understood that the mechanism can be implemented in the aforementioned applications, mutatis mutandis. The terms "blades" and "segments", and their derivatives including "blade segments", may be used interchangeably herein the specification and claims.

It is a particular feature of the present telescopic mechanism that it includes a specially designed nut as part of the extension/retraction mechanism. The nut has a flexible and resilient thread mechanism that allows a correspondingly threaded spindle to engage the nut thread mechanism with enough rigidity so that the nut will be driven by the threaded spindle when the spindle is rotated (such as when the sword is being extended) and yet the flexible/resilient nut threads will slide over the threads of the spindle above a given (threshold) force (such as when the extended sword is pressed into a rigid or semi-rigid body, for example a person, thereby providing a safety feature).

In this regard, the flexible nut threads also allow for each nut to re-engage with the spindle when the sword is collapsed (retracted), in particular, suddenly collapsed, which can occur for example by a person pulling out (extending) and pushing on (retracting/collapsing) the sword blade segments. The opening defined by the teeth (nut opening) can become larger due to the flexibility of the teeth, whereby the nut can slide back down on the threaded spindle (and then the teeth can close back to its original non-flexed dimension).

The flexible nuts also help the sword blade segments retract quickly and allow the segments to move on the spindle because, being flexible, they can suit themselves to various situations (i.e. if the nut is at a slight angle or not completely centered) during extension and retraction. For example, during retraction, the flexible nuts (in particular, flexible threads thereof) can quickly pass over the spindle.

It is a particular feature of the present telescopic mechanism that it includes a blade segment extension stopper (e.g. outwardly facing step and corresponding inwardly facing shoulder on adjacent segments). As such, the segments are stopped after being extended to their predetermined full extent without requiring a friction stop between blade segments, as is common in conical telescopic swords.

One potential advantage of this feature is that the telescopic segments are not rigidly held in an extended position whereby if the sword is pressed into a surface or object the extended segments will not provide a strong poking force and may even retract from pressure. As such, the sword can include the attractive feature of being automatically extended and retracted, without undue safety concern. Further, manual retraction or extension of the sword blade segments will not destroy the extension/retraction mechanism (due to its flexible/resilient nature), nor will the extension/retraction mechanism be compromised by retraction/collapse of the blade segments due to exceeding the aforementioned poking force.

It is another particular feature of the present invention that due to its configuration, the sword blade (blade segments) can be swapped out for another blade (blade segments).

BRIEF DESCRIPTION OF THE DRAWINGS

The invention may be more clearly understood upon reading of the following detailed description of non-limiting exemplary embodiments thereof, with reference to the following drawings, in which:

FIG. 3 is a perspective cut-away view of the telescopic item and mechanism showing a power source therefor, in accordance with embodiments of the present invention.

FIGS. 4, 5A and 5B are perspective views of a spindle and nut of the telescopic item and mechanism, including an enlargement, in accordance with embodiments of the present invention.

FIGS. 6A and 6B are perspective cut away views illustrating the telescopic item and mechanism in an extended position, including an enlargement thereof, in accordance with embodiments of the present invention.

FIGS. 9A-9E are top views of various exemplary configurations of the nut of the telescopic item and mechanism, in accordance with embodiments of the present invention.

FIGS. 10A and 10B are side views of the telescopic item, in accordance with embodiments of the present invention.

FIGS. 12A and 12B are perspective and side views, respectively, of the present invention showing additional exemplary embodiments.

Figure 1:
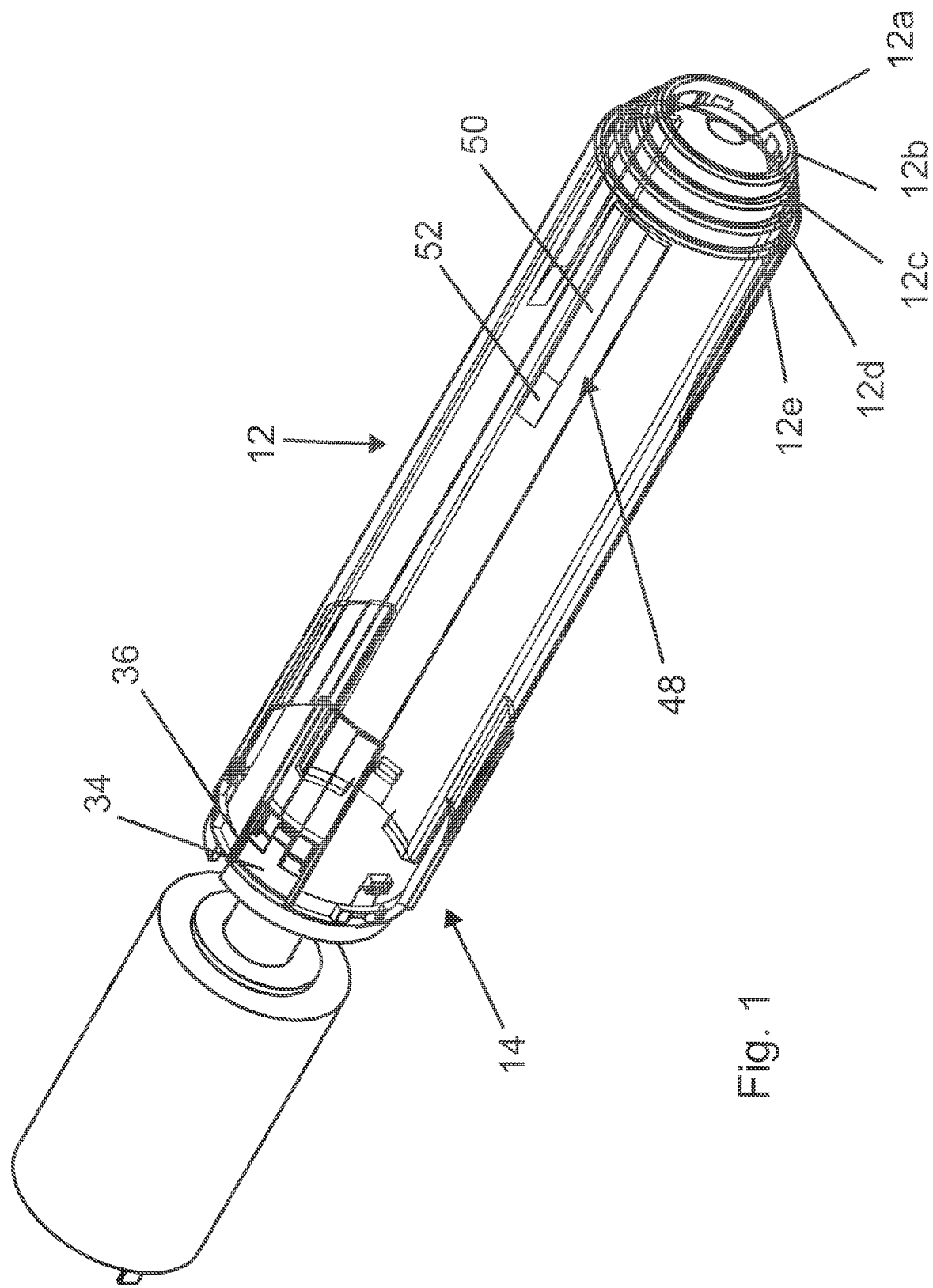
FIG. 1 is a perspective view of a telescopic item and mechanism therefor, in accordance with embodiments of the present invention.
Figure 2:
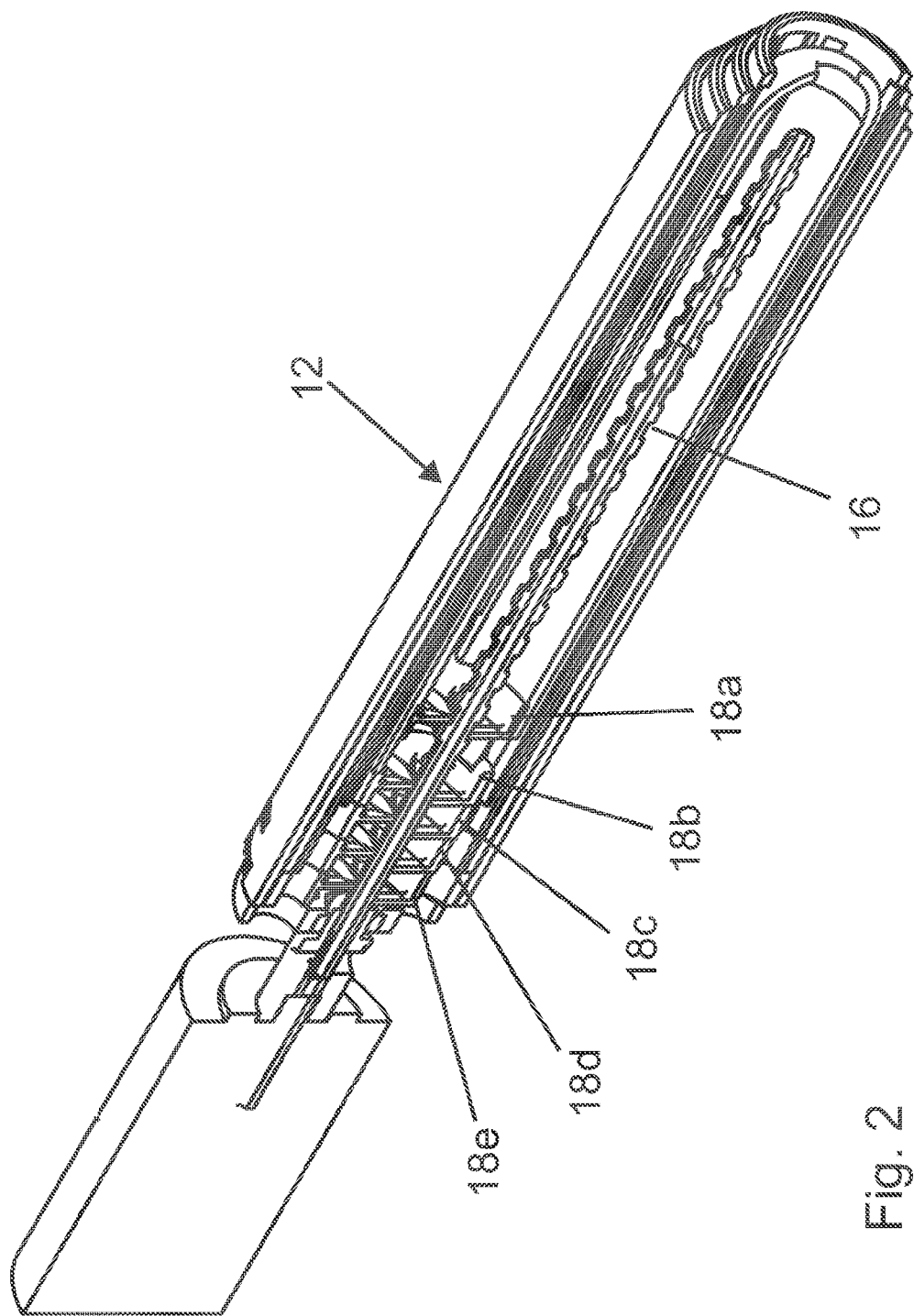
FIG. 2 is a cut-away view of FIG. 1.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DESCRIPTION OF EMBODIMENTS OF THE INVENTION

Identical, duplicate, equivalent or similar structures, elements, or parts that appear in more than one drawing are generally labeled with the same reference numeral, optionally with an additional letter or letters for reference to particular objects. Dimensions of components and features shown in the figures are chosen for convenience or clarity of presentation and are not necessarily shown to scale or true perspective. For convenience of clarity, some elements or structures may not be shown or shown only partially or with different or without perspective, and duplicate or equivalent or similar parts may not be repeatedly labeled and/or described.

The following description relates to one or more non-limiting examples of embodiments of the invention. The invention is not limited by the described embodiments or drawings, and may be practiced in various manners. The terminology used herein should not be understood as limiting unless otherwise specified.

The figures show a toy sword of the telescopic type, in accordance with embodiments of the present invention. With reference to FIGS. 1-3, 10A and 10B the sword includes a hilt 10; a telescopic segmented hollow sword blade 12—for example with five hollow blade segments 12a, 12b, 12c, 12d, and 12e; and a telescopic mechanism 14 that effects extension and retraction of the blade. Telescopic mechanism 14 includes a threaded rod or spindle 16 that passes through the longitudinal axis of the blade 12; and a plurality of flexible/resilient nuts 18 (individually designated 18a, 18b, 18c, 18d, and 18e—each nut respectively interfacing at the proximal portion of each hollow blade segment 12a-12e of blade 12). The nuts 18a-18d have threads corresponding to those of the spindle, and which will be described in more detail herein-below. Nuts 18a-18e are dimensioned, in particular their diameters/circumferences, in a series of sizes (FIGS. 2 and 3) corresponding to the inner diameters of the sequentially sized blade segments 12a-12e. In the embodiments shown in the figures, segments 12a-12e are illustrated as cylindrical (having a circular profile/cross-section), however, they can be tapered (slightly conical) or have a square profile or other profiles such as triangular, rectangular, elliptical or polygonal, etc.

Telescopic mechanism 14 is activated by a motor 20 (FIG. 3), which is powered by a power source 22, such as one or more batteries, and operated by one or more actuator buttons 24 (FIG. 3). Alternatively, telescopic mechanism 14 can be powered mechanically, for example, by a spring mechanism (not shown) or the like. Spindle 16 can be coupled to motor 20 via a coupling 26 (FIG. 3).

FIGS. 4, 5A-5B and 8A-8E show embodiments of one of the nuts 18 on spindle 16 including an enlarged view wherein the nut threads are constituted by a plurality of spindle-thread interfaces such as inwardly projecting teeth 28. Teeth 28 are configured with a/some combination of material, dimensions (length, thickness and width) and end shape such that the teeth are sturdy or rigid enough so that nuts 18 will move back and forth (up and down) on spindle 16 (in particular, the spindle's thread 30) when the spindle is rotated, but also wherein the teeth are flexible and resilient so that the teeth will slide over the spindle's thread if the end of blade 12 is pushed into a significantly rigid body (e.g. a person or a wall). Teeth 28 are preferably disposed at different heights or levels around the nut, in a spiral staircase-like manner (FIGS. 5A-5B), although they need not be so arranged.

Figures 5A, 5B:
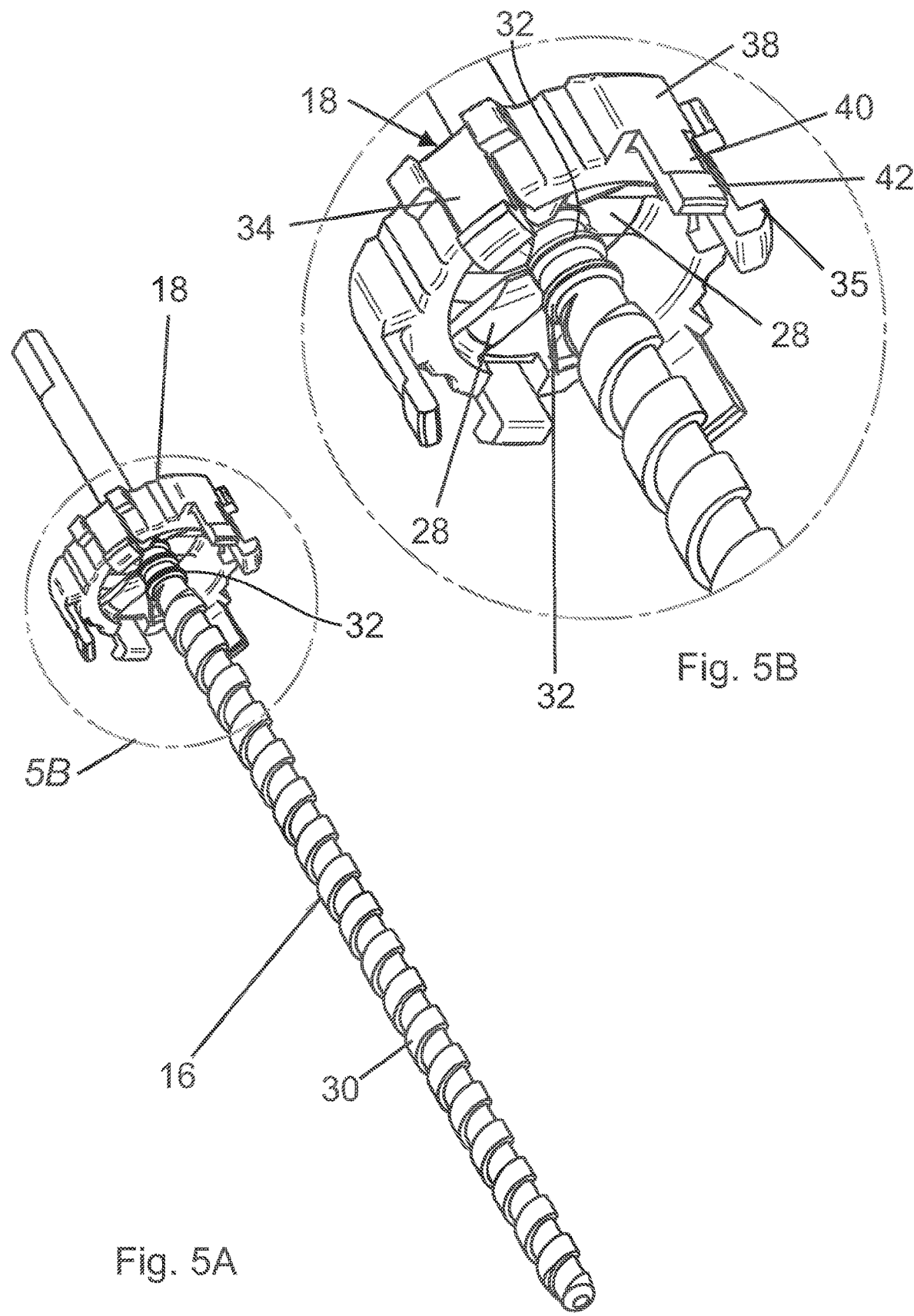
Figure 13A:
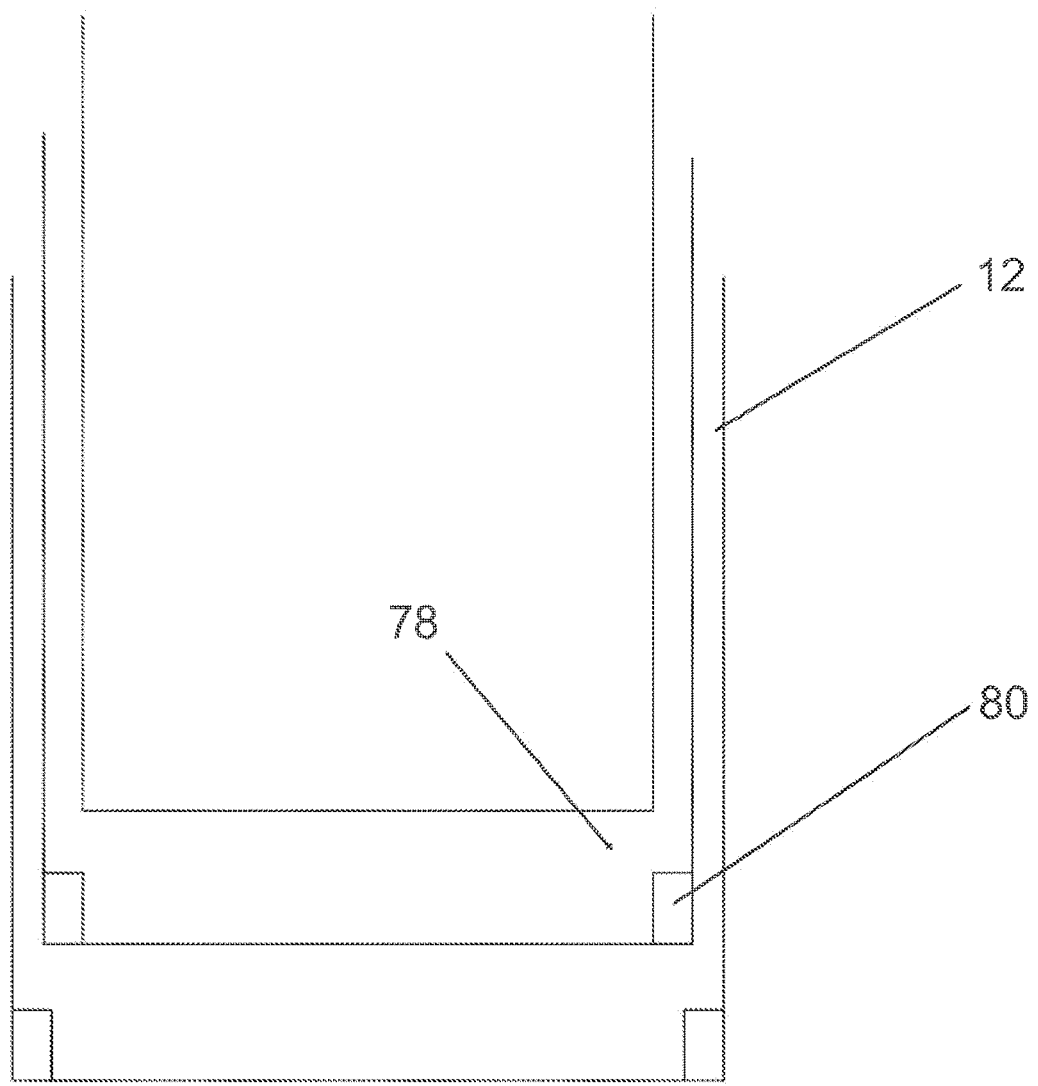
FIGS. 13A-13C are internal side views depicting exemplary segment extension restraining mechanisms of the present invention, in accordance with embodiments thereof.
Figure 13B:
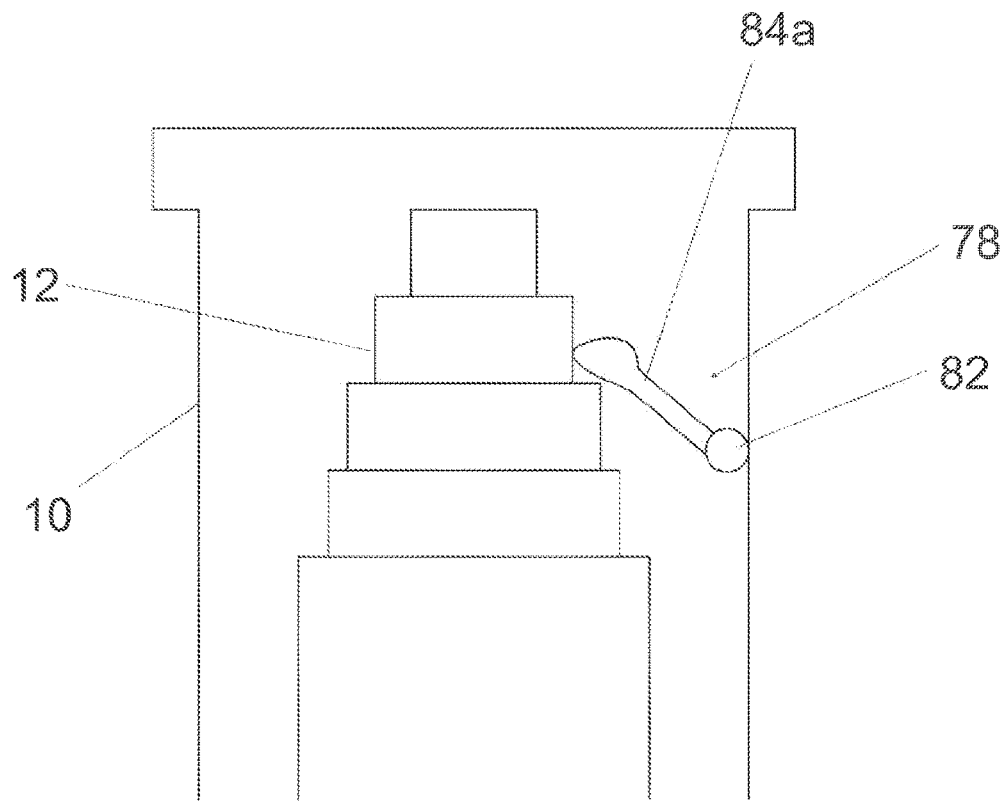
Figure 13C:
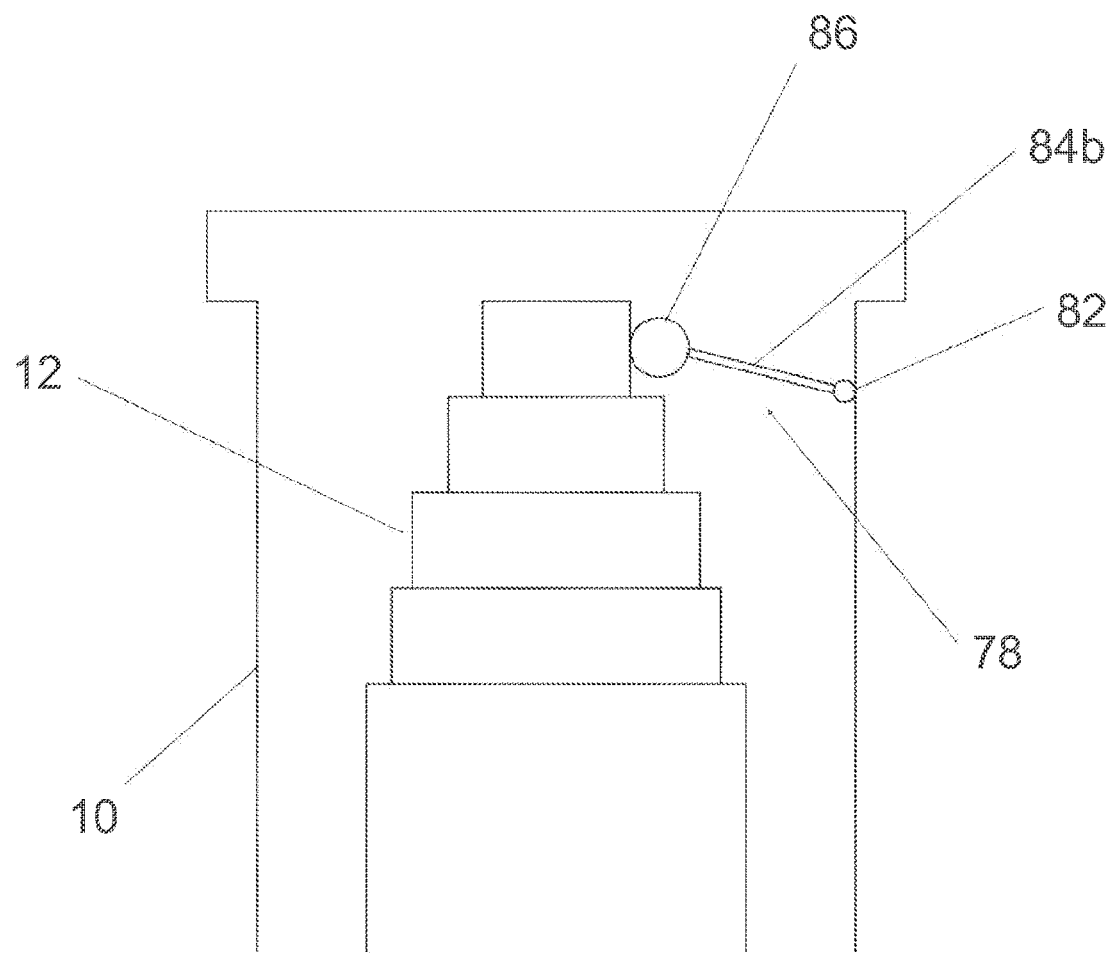

FIGS. 5A-5B further show that, in preferable embodiments, spindle 16 has a nut/segment-brake mechanism 32 (aka a segment extension restraining mechanism), exemplified by one or more brake rings 32 (but could alternatively be constituted by an alternately designed brake components (for example as illustrated in FIGS. 13A-13C) or an L-shaped or finger-shaped arm, or an annular outward ring at the proximal end of the segments, not shown, or the like). In some embodiments, the aforementioned brake component, or equivalent, is mounted on the outside of hilt 10 and is configured to interact with the segments 12 so that the segments will extend sequentially. This nut/segment-brake mechanism 32 prevents each segment 12 from extending until the sequentially smaller segment has fully extended, at which point, the subsequent nut 18 is pulled with enough force so that the subsequent nut slides over the brake mechanism. However, alternatively, if motor 20 provides sufficient thrust, the segments 12 can extend at once because of their momentum.

Nuts 18a-18e can be attached to the respective proximal ends of blade segments 12a-12e in any suitable manner, including, via welding; a threaded connection; adhesives; or even integrally molded in a one-piece configuration. An exemplary manner shown in FIG. 1 of attaching nuts 18a-18e to blade segments 12a-12e is by way of one or more segment-connection elements 34, for example, that securely snap via shoulders 35 into corresponding spaced apart apertures or cut-outs 36 at the proximal ends of respective blade segments.

Best seen in the enlargement in FIG. 5B, in some embodiments, nuts 18 include one or more nut-to-segment friction members 38 having a resilient arm 40 with an outwardly facing shoulder 42 to provide a finite but minimal friction resistance with the segments 12 to prevent the segments from spontaneously retracting until desired. This resistance is preferably minimal so that the segments 12 will retract above a relatively low threshold force, for safety reasons, e.g., if the sword is stuck hard into a child's body. FIGS. 6A and 6B shows an embodiment wherein blade segments 12a-12e are cylindrical (i.e. have a circular cross-section). To prevent segments 12 from detaching from each other during extension, segments 12a-12d may have a blade segment extension stopper including an outwardly facing step 44 (e.g. annular) at their proximal ends; and segments 12b-12e have a corresponding inwardly facing shoulder 46 at their distal ends (or vice versa).

The distal ends of segments 12 may have a slightly smaller inner diameter than their proximal ends whereby there is a finite but minimal friction between adjacent segments in order to hold the segments connected together more robustly. In some embodiments, the aforementioned smaller inner diameter is gradual, gradually getting smaller toward the distal ends, along the length of segments 12.

Reverting to FIG. 1, wherein the blade segments 12a-12e are cylindrical, in some embodiments, in order to help prevent the segments from spinning when motor 20 is operated and thus spindle 16 rotates, the segments have a segment spin-prevention mechanism 48, exemplified by an elongated groove 50 in one side of each segment and a corresponding rail 52 in the other side of an adjacent segment. Spin-prevention mechanism 48 prevents the segments from spinning when spindle 16 rotates during extension and retraction. Regardless, in some embodiments, the device does not include any segment spin-prevention mechanism, rather either the rotation of spindle 16 relative to the segments 12, by motor 20, is such that nuts 12 move back and forth; or, segments 12 are configured whereby there is friction between neighboring segments to mitigate or even prevent rotation thereof.

Figure 7:
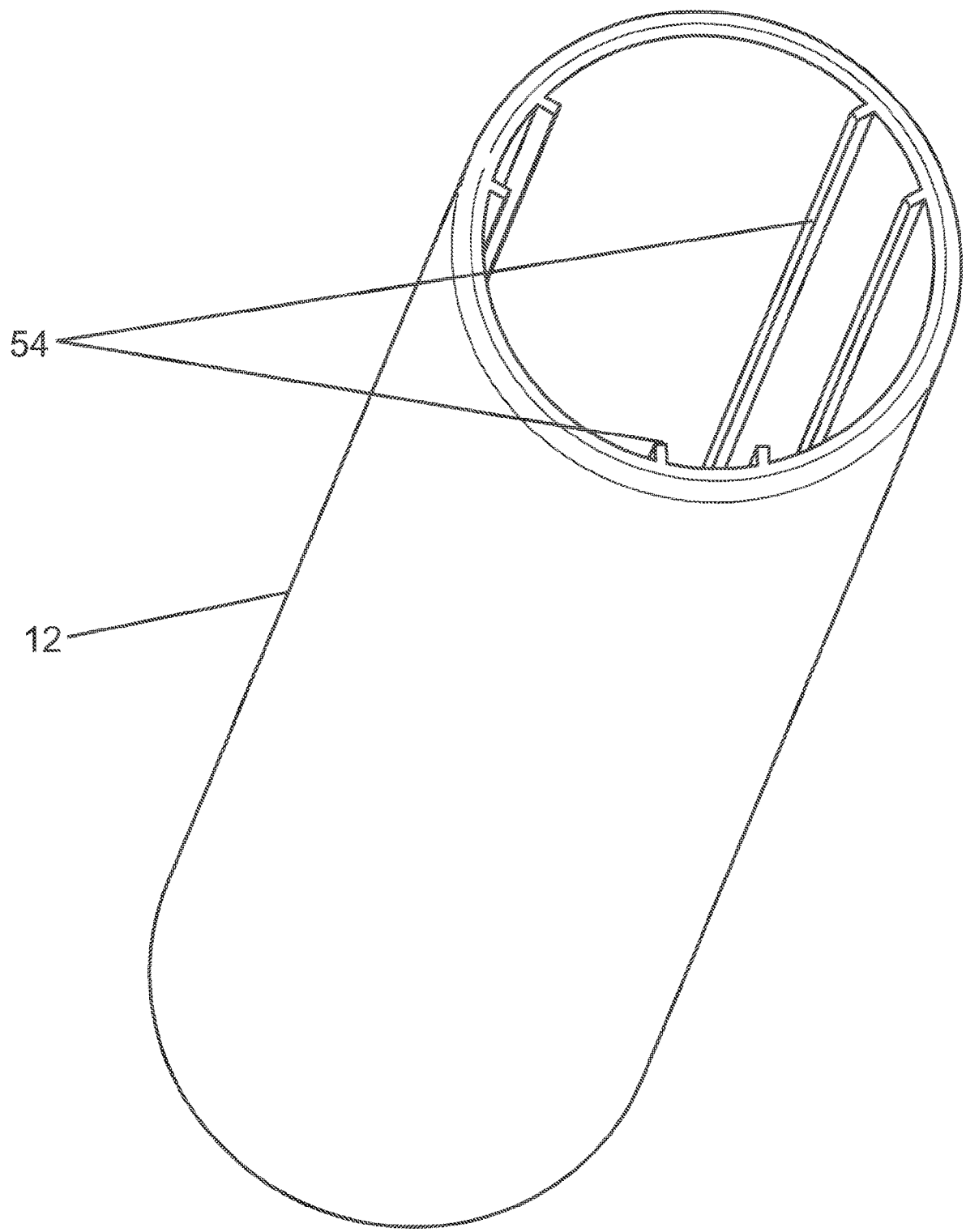
FIG. 7 is a perspective view of a segment spin-prevention mechanism, in accordance with embodiments of the present invention.

Segment spin-prevention mechanism 48 can be any suitable mechanism, and for example, may include rails or ridges 54 (FIG. 7), linear bumps, channels, and so on. It should be noted that in the cases where segments 12 do not have a circular profile, there is no need for segment spin-prevention mechanism 48.

Alternatively, segment spin-prevention mechanism 48 can be constituted by longitudinal rods (not shown), or the like, passing through corresponding through-hole(s) 56 of the nuts 18 (FIG. 8A), or otherwise blocking rotation of the nuts.

It should be understood that nuts 18 can be configured to provide the same function by way of other mechanisms or components such as via a suitably configured coil spring (not shown) that interfaces with spindle 16 in a manner similar to teeth 28.

Figure 8A:
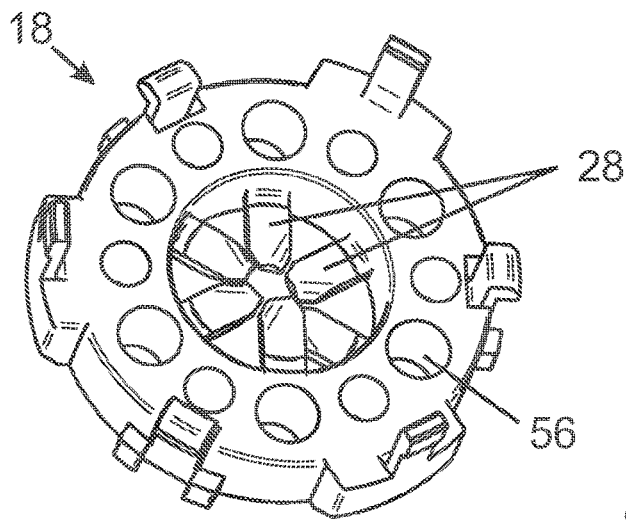
FIGS. 8A-8E are various views of the nut of the telescopic item and mechanism, in accordance with embodiments of the present invention.
Figure 8B:
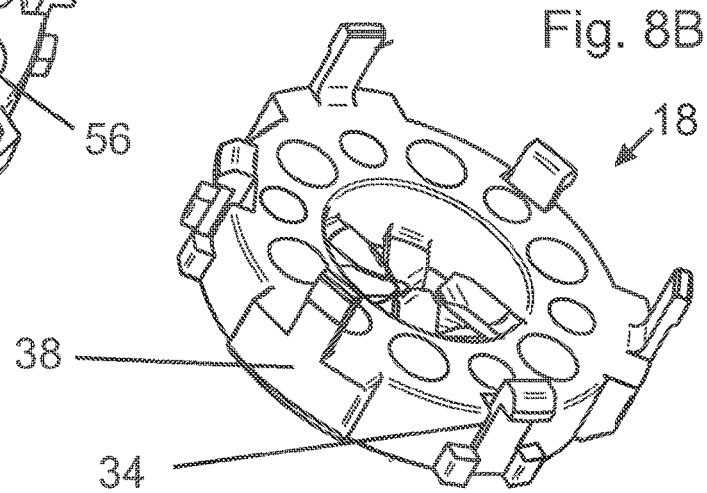
Figure 8C:
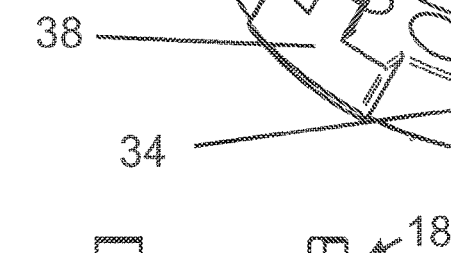
Figure 8D:
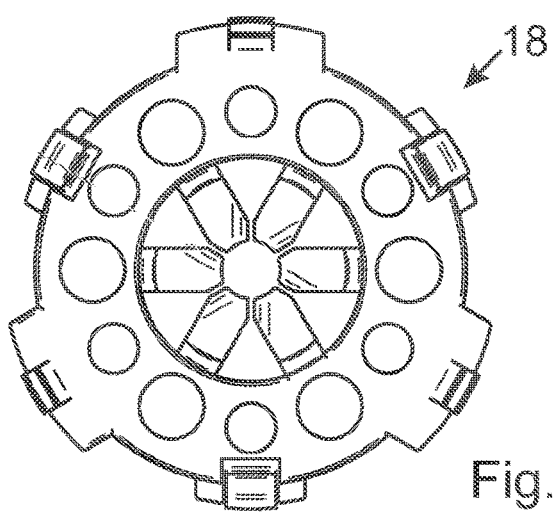
Figure 8E:
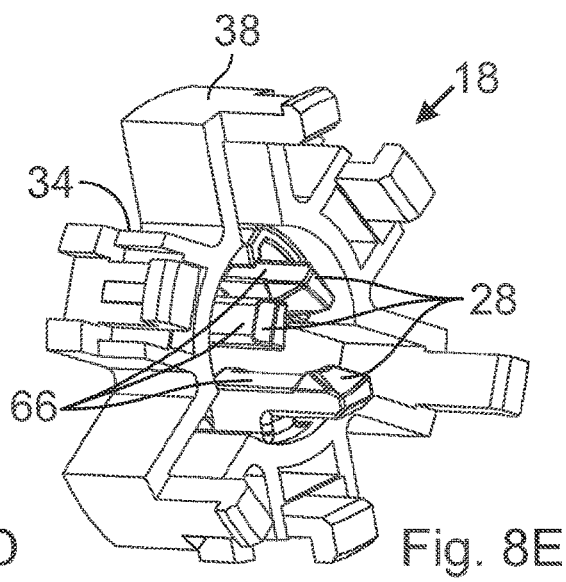
Figure 9A:
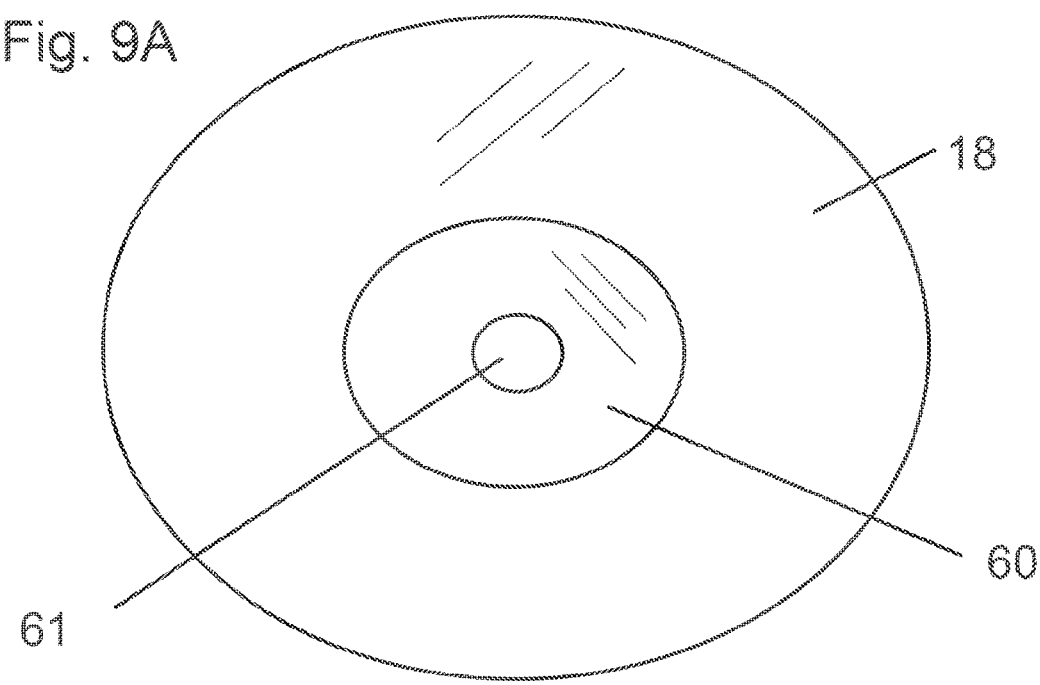
Figure 9B:
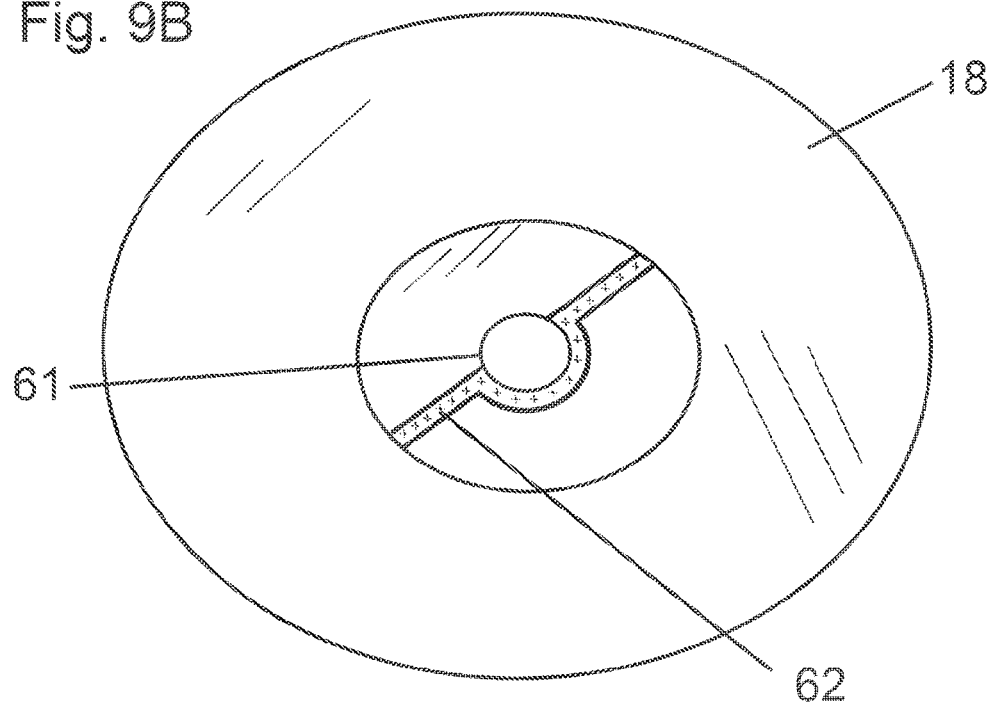
Figure 9C:
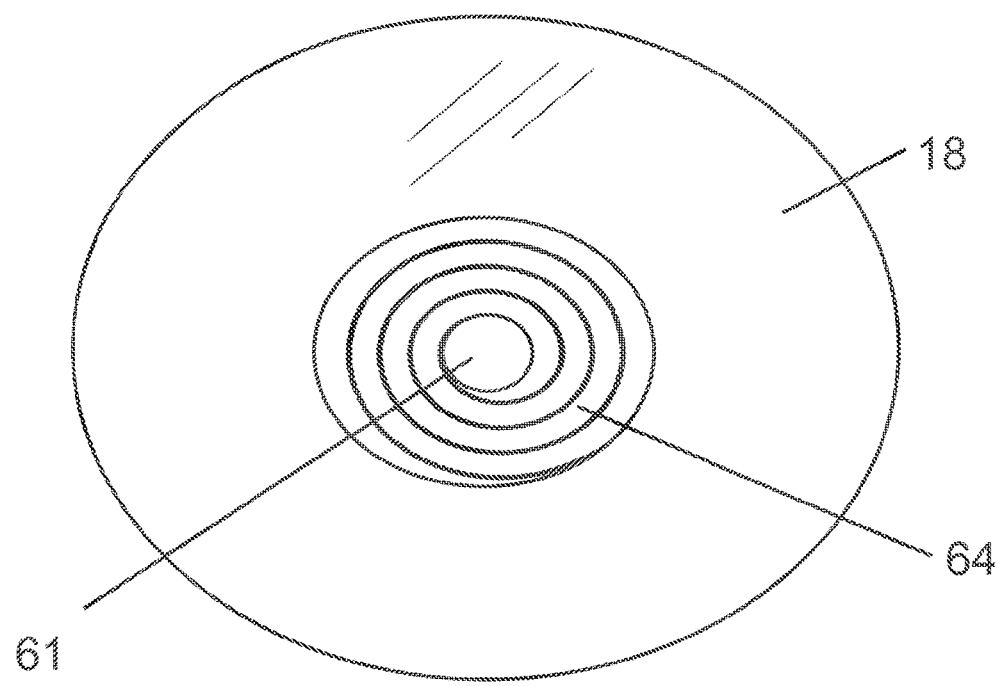
Figure 9D:
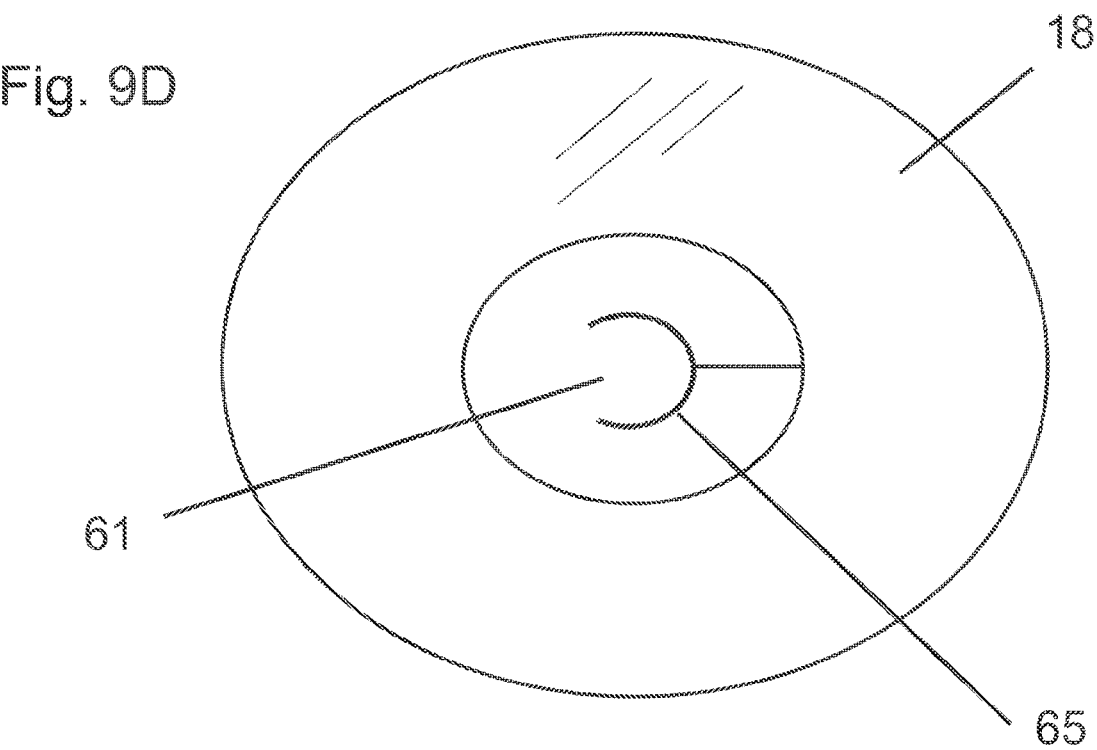

In this regard, FIGS. 9A-9D provide a number of examples of possible alternative nut configurations. A nut opening 61 indicates where spindle 16 would pass through nut 18. FIG. 9A shows an embodiment of nut 18 with a flexible and resilient central annular element 60 (and acting in a manner similar to teeth 28); in some embodiments the disk is a partial disk (not shown). FIG. 9B shows an embodiment of nut 18 with a flexible and resilient strip 62 crossing through or approximately through the center of the nut (the strip acting in a manner similar to teeth 28). FIG. 9C shows an embodiment of nut 18 with a flexible and resilient spiral member 64 (the member acting in a manner similar to teeth 28), which in some embodiments the disk is a partial spiral strip (not shown). FIG. 9D shows an embodiment of nut 18 configured with a wine-glass shaped resilient spindle-thread interface element 65 (the element acting in a manner similar to teeth 28). FIG. 9E shows an embodiment of nut 18 configured with resilient and generally upward extending petal-like projections 66 having ridges 68 for engaging with the spindle thread 30 (the projections acting in a manner similar to teeth 28). FIG. 8E shows an embodiment of one of the nuts 18 including generally upward extending projections 66, where the nut threads are constituted by a plurality of spindle-thread interfaces such as inwardly projecting teeth 28.

Alternatively, spindle thread 30 is made of a flexible/resilient material rather than nut 18 (e.g. teeth 28).

In some embodiments, nut 18 allows light to pass through as a result of having openings and/or being made of a transparent or translucent material. This allows for lighting features.

FIGS. 10A and 10B show respective side views of the sword in a fully retracted and fully extended position.

In some embodiments (not shown), motor 20 is automatically turned off when the sword is fully extended; for example, when the final segment is extended, a switch in an electric circuit that includes the motor can turn off the motor. Similarly, in some embodiments, motor 20 is automatically turned off when the sword is fully retracted.

In some embodiments, telescopic mechanism 14 is manually operated, and thus includes a manually powered mechanism (not shown), for example, including a crank, thumbnail, winding apparatus, or the like.

It should be understood that telescopic mechanism 14 can be used to extend and retract segments having any telescopic-able/inter-engageable profile shape, not just conical, rather segments that are cylindrical (i.e. have a circular profile), or have substantially square; rectangular; triangular; and polygon profiles, and so forth.

Figure 11:
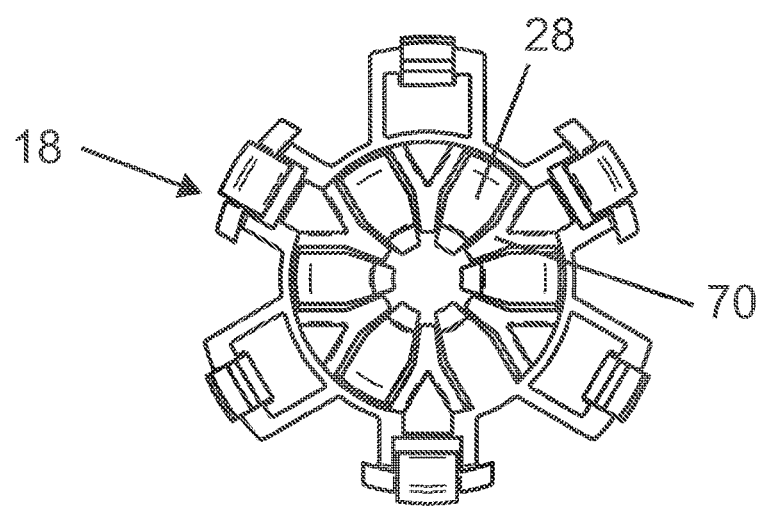
FIG. 11 is a top view of another exemplary configuration of the nut of the telescopic item and mechanism, in accordance with embodiments of the present invention.

FIG. 11 show flexible/resilient nut 18 wherein the nut further includes teeth side supports 70 to support and/or protect teeth 28; basically acting as lateral stabilizers. Teeth side supports 70 are located between (on the sides) of the teeth, and exemplified by Y-shaped supports. The sides of respective supports 70 are preferably very close to corresponding/opposing sides of teeth 28. Such supports 70 can be useful in case spindle 16 goes off-center during use and could thus (otherwise) potentially produce some side (lateral) force and damage teeth 28. Side supports 70 limit, or may even prevent, lateral movement of teeth 28.

FIGS. 12A-12B show the toy sword including a segment holder 72 (FIG. 12A) in the form of a ring, which can be an elastic ring, snap-fit ring or threaded ring(s) thusly configured to allow segments 12 to be attached and removed to hilt 10, i.e. to be replaced. FIG. 12A also shows optional lighting element(s) 74, such as one or more LEDs, whose light can shine outward via one or more light openings or windows 76 (FIG. 12B).

FIGS. 13A-13C illustrate segment extension restraining mechanisms 78 that prevent segments 12 from prematurely extending, i.e. to ensure the segments extend sequentially, each segment in its turn; an alternative to nut/segment brake mechanism ring(s) 32 (FIGS. 5A-5B). In FIG. 13A, segment retaining mechanism 78 includes one or more small friction elements 80 (which could be constituted by an annular friction element) in the proximal interior end of segments 12. However, as can be understood, no friction element(s) are required in the most distally extending segment. These friction elements 80 frictionally interface with respective subsequent segments 12 and hold those segments with a small/weak friction force, to ensure that each segment extends one after the previous (earlier extending) segment has completely extended.

FIG. 13B-13C show alternative segment extension restraining mechanisms 78 that prevent segments 12 from prematurely extending. In FIG. 13B, segment extension restraining mechanism 78 includes a restraining lever 84a whose proximal end 82 is attached to hilt 10 and may include a weak biasing element or spring (not visible) that is biased to urge the lever toward the proximal end of the sword (downward in the figure). The distal end of restraining lever 84a is configured and positioned to interface with the distal end of segments 12 (though not necessarily the initially extending segment). As such, restraining lever 84a provides a small/weak force on segments 12, to ensure that each segment extends one after the previous (earlier extending) segment has completely extended.

In FIG. 13C, segment extension restraining mechanism 78 includes a restraining lever 84b that is generally similar to that of FIG. 13B, however lever 84b includes a rotatable wheel 86 at its distal end. Rotatable wheel 86 may be configured so that there is friction between the wheel and lever 84b to provide a small/weak friction force to ensure that each segment 12 extends one after the previous (earlier extending) segment has completely extended. This wheel-to-lever friction force can be an alternative to the biasing element or spring in lever 84a.

Figure 14A:
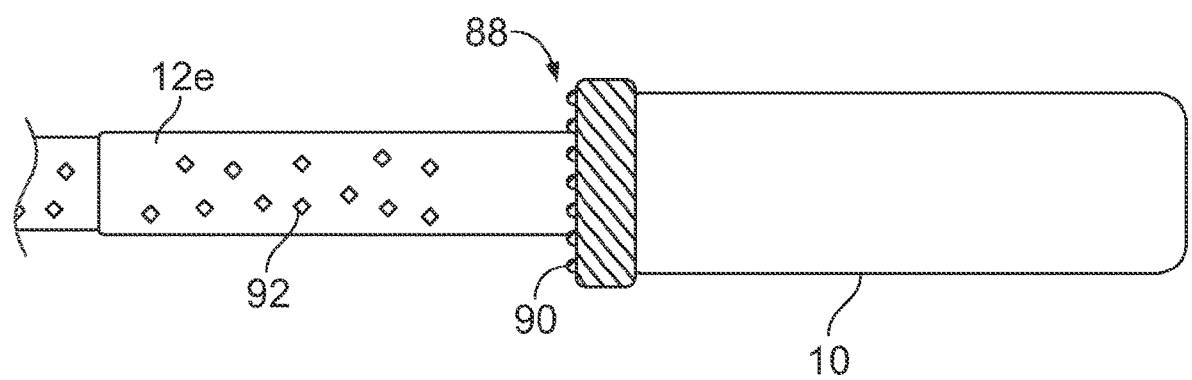
FIGS. 14A-14D are various views depicting exemplary embodiments of an illumination device of the present invention.

FIGS. 14A-14D illustrate various lighting features that can be incorporated in the sword. FIG. 14A shows an exterior illumination device 88 that can be installed at the top of hilt 10 (e.g. a ring of powerful bulbs or LEDs 90) to shine up the outer part of segments 12. The segments 12 may have slits, apertures or segment windows 92 to reflect a dazzling light around the sword and produce a kind of aura around it.

Figure 14B:
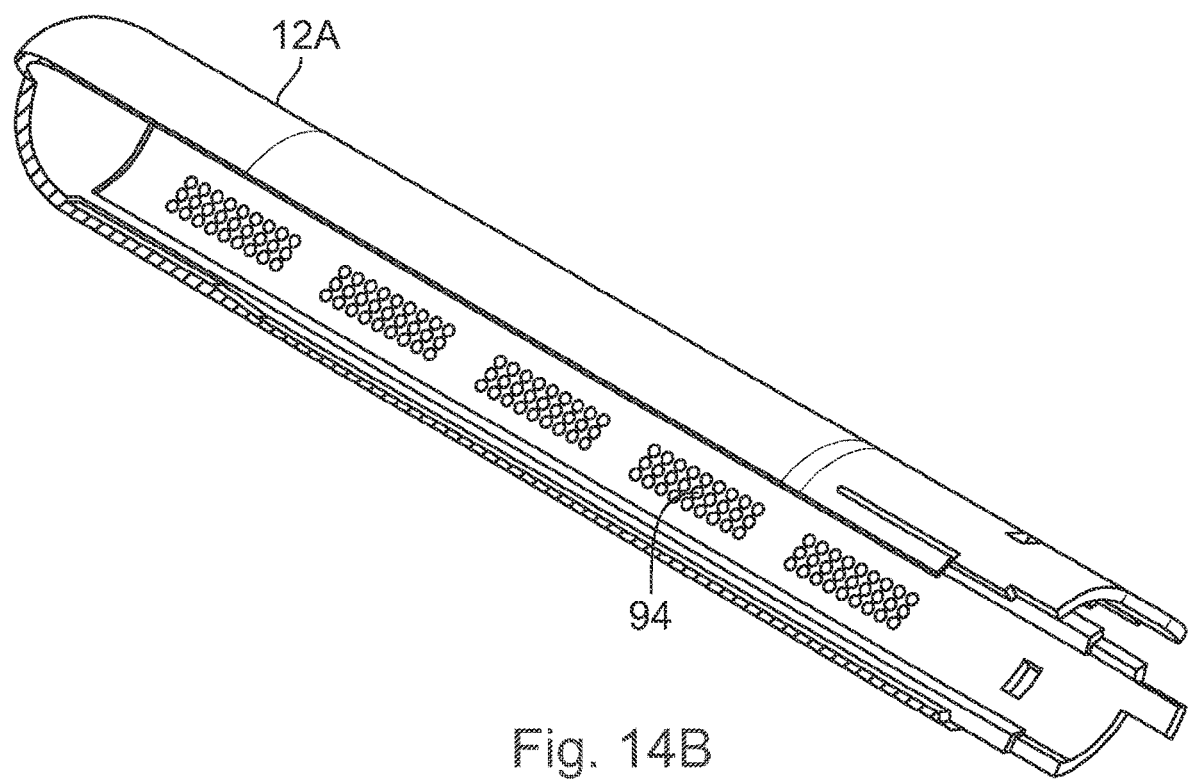

FIG. 14B illustrates illumination device 88 including openings or piercings 94 in segments 12 to allow light to shine there-through. Piercings 94 may be produced by a molding process during production of segments 12, which are typically made of a plastic material.

Figure 14C:
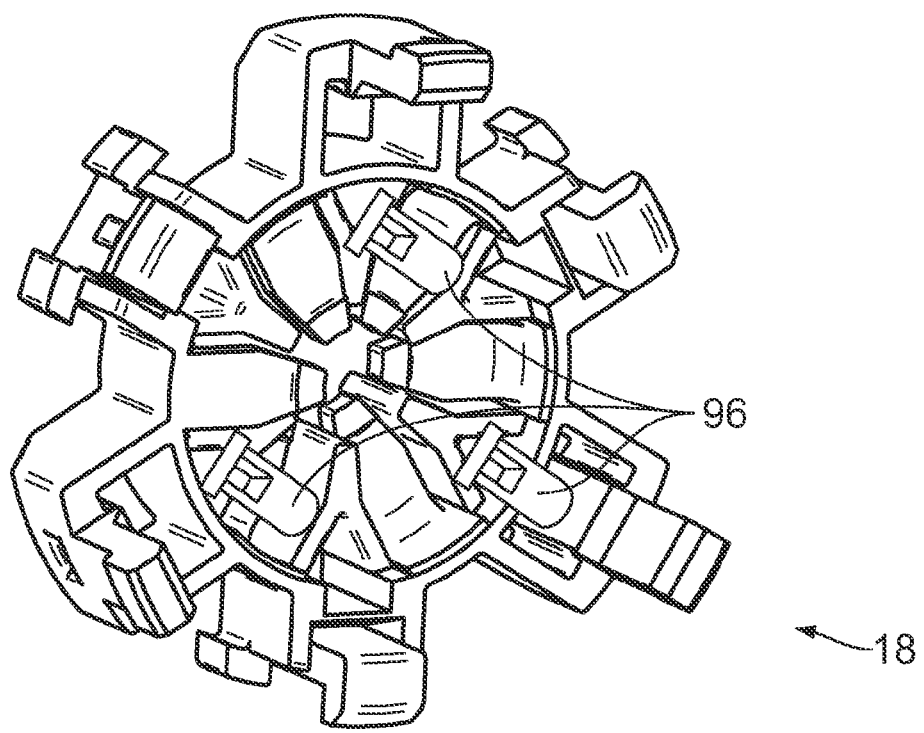

In FIG. 14C, illumination device 88 includes one or more of the flexible nuts 18 has one or more illumination elements 96, such as nut light-bulbs or LEDs that light up subsequent segments 12. Each segment 12 includes an electrical conductor 98 (FIG. 14D) such as a strip of electric conductive paint or electrically conductive metal to transmit electric power from power source 22. As a result, in an extended position, the sword can shine with a bright light.

Figure 14D:
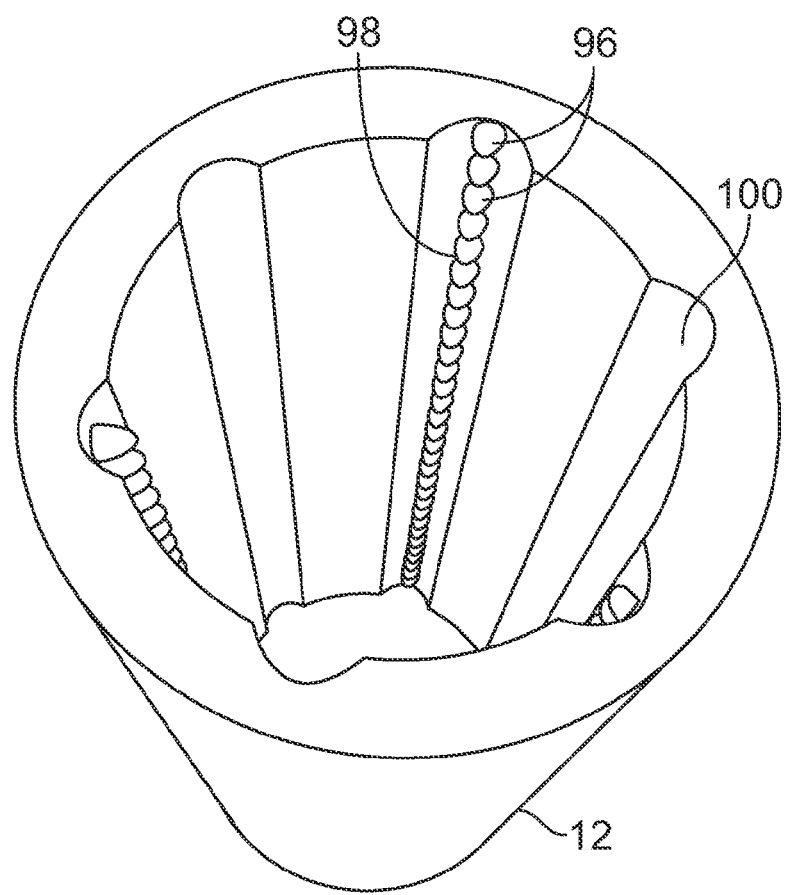

FIG. 14D illustrates illumination elements 96 (e.g. series of light bulbs or LEDs) and electrical conductor 98 (of illumination device 88) disposed along each segment 12. Conductor may be disposed in an elongated recess 100. In an extended mode, the sword can thus shine with a bright light.

OPERATION (with a motorized sword): to automatically extend sword blade 12 from hilt 10, the user activates motor 20 by pressing on extension actuator button 24, whereby spindle 16 rotates. As a result, the first (smallest) nut 18a rises on the spindle to extend/push the first (smallest) segment 12a (which is positioned above nut/segment brake mechanism 32). When segment 12a is fully extended, it pulls on the next largest segment 12b (outwardly facing step 44 contacts shoulder 46), pulling the next nut 18b over brake mechanism 32, and nut 18b rises on spindle 16 to extend segment 12b, and so on.

Depending on the particular design of the actuator, sword blade 12 can be retracted by pressing another (retraction) actuator button 24 or the same button, whereby motor 20 turns spindle 16 to pull/retract segments 12.

It should be understood that the present telescopic mechanism can be used in a retrofit manner, i.e. as part of existing segmented swords or other such telescopic components.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A method of providing a telescopic assembly for a toy sword comprising:
   providing a power mechanism to rotate a threaded spindle which is coupled to telescopic segments, wherein rotating said threaded spindle causes said telescopic segments to extend out of a handle to an extended position; and
   providing a safety feature wherein, if said telescopic segments in the extended position are pressed by a poking force against a person, said poking force causes said telescopic segments to retract in a direction towards said handle thereby preventing injury to the person, and said power mechanism and said threaded spindle are not compromised or destroyed by retraction of said telescopic segments due to said poking force.

2. The method according to claim 1, wherein retraction of said telescopic segments towards said handle comprises said telescopic segments nesting into each other.

3. The method according to claim 1, wherein retraction of said telescopic segments towards said handle comprises relative sliding motion between mechanical fasteners located on said telescopic segments and said threaded spindle.

4. The method according to claim 1, further comprising providing at least one illumination element and at least one electrical conductor disposed along at least one of said telescopic segments.

5. The method according to claim 4, further comprising causing said at least one illumination element to illuminate when said telescopic segments are in an extended position.

6. The method according to claim 1, further comprising providing a set of different telescopic segments for use in place of said telescoping segments.

7. The method according to claim 1, further comprising using said telescopic assembly in a retrofit manner by replacing a telescoping mechanism of an existing toy sword with said telescopic segments, said threaded spindle, and said power mechanism.

* * * * *